April 25, 1967     W. OSER     3,316,163
ELECTROCHEMICAL METHOD FOR CONVERSION OF CARBON DIOXIDE
Filed May 2, 1961
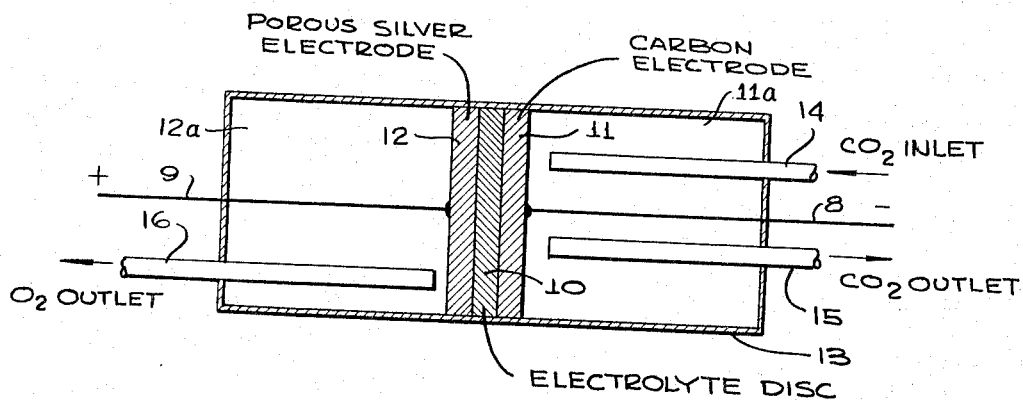
INVENTOR
WILLEM OSER
BY Hurwitz and Rose
ATTORNEYS _United States Patent Office_

3,316,163
Patented Apr. 25, 1967

3,316,163
ELECTROCHEMICAL METHOD FOR CONVERSION OF CARBON DIOXIDE
Willem Oser, Palisades Park, N.J., assignor to Isomet Corporation, Palisades Park, N.J., a corporation of New Jersey
Filed May 2, 1961, Ser. No. 107,241
7 Claims. (Cl. 204—129)

This invention relates to a process and apparatus for converting $CO_2$ to $O_2$ and has particular application to the elimination of $CO_2$ that is continuously being produced in a closed space, by converting the $CO_2$ to $O_2$ and C. More particularly, this process may be used in converting $CO_2$ that accumulates in the atmosphere of a submarine vessel or a manned space vehicle as a result of the respiration of its occupants.

As is well known, animal respiration involves taking $O_2$ from the atmosphere and giving up to the atmosphere $CO_2$ produced in the animal. Accordingly, if an animal is to survive in a closed space $O_2$ must be added to the atmosphere and the $CO_2$ must be removed. Ordinarily, in submarines, for example, this is effected by supplying $O_2$ from storage tanks. The storage of a large number of $O_2$ tanks for long periods of submergence presents very distinct disadvantages. Also the storage of relatively large quantities of absorbents for $CO_2$ presents a problem.

In accordance with the present invention, the $CO_2$ in the atmosphere can be replenished by using $CO_2$ given up during respiration as a source material for the $O_2$.

It is accordingly an object of the present invention to provide an electrochemical process for converting $CO_2$ to $O_2$.

It is a further object of the present invention to provide an apparatus for effecting conversion of $CO_2$ to $O_2$.

It is a further object of the present invention to provide a process and apparatus adapted to convert to $O_2$, $CO_2$ collected in a confined area.

Other and more detailed objects and features of the invention will be apparent from the following description and drawing, the latter being a schematic representation of an embodiment of the present invention.

The single figure of the drawing is a schematic representation of a device according to the present invention.

In accordance with the present invention a $CO_2$ containing gas, for example, that accumulated in the atmosphere of a submerged submarine or space vehicle is decomposed electrochemically to produce carbon and oxygen using a novel electrochemical device having a solid electrolyte.

Certain mixed oxides, notably $ZrO_2$–$Y_2O_3$ and $ThO_2$–$Y_2O_3$ or $ThO_2$–$La_2O_3$ form anomalous mixed crystals (solid solutions) in which there are vacant places (holes) distributed statistically at random throughout the anion component lattice. These make it possible for the O−− ions to jump from "hole" to "hole" and therefore to migrate in an electrical field. Based on this principal an electrochemical cell can be constructed in which $CO_2$ is fed in at one electrode and oxygen emerges at the other electrode, the whole system, both electrodes and solid electrolyte, being held at a temperature in the range of 400 to 900° C. with an electrical potential sufficient to cause the desired rate of decomposition of the $CO_2$ to occur.

The present process for decomposition of $CO_2$ may be operated over a wide range of flow rates, the flow rate of $CO_2$ being adjusted to replace the $CO_2$ decomposed in the cell. The carbon produced in this cell may be removed from the system in a suitable fashion and pelleted or made into briquettes. This carbon does not affect the cell operation, since in normal practice the electrode at which the carbon is formed is made of carbon.

The following non-restrictive example is further illustrative of the present invention, being described by reference to the accompanying drawing.

*Example*

For the purposes of this example a solid electrolyte disc 10 was prepared from a mixture of $ThO_2$ and $Y_2O_3$. A mixture of finely ground powders having a composition of 72 mole percent $ThO_2$ and 28 mole percent $Y_2O_3$ was used since the fluorite lattice of the $ThO_2$ can form solid solutions with $Y_2O_3$ up to 30 mole percent $Y_2O_3$. This mixture was pressed into a disc 4 mm. thick and 1 inch in diameter at room temperature and then fired at 1500° C. in an air atmosphere for five hours. After cooling, the disc was reground, the powder pressed into a disc and fired again at 1500° C. for five hours. This process was repeated until a gas tight disc 10 possessing the desired single phase fluorite structure was successfully prepared containing a complete cation lattice and a deficient anion lattice. The latter was verified by structure analyses made with a Geiger counter X-ray spectrometer.

This disc 10 was then placed between a carbon cathode electrode 11 and a porous silver anode electrode 12. The whole assembly was then sealed into a cylindrical Zircum tube 13 forming separate chambers 11a and 12a. An electric potential of 10 volts was imposed through conductors 8 and 9 across the two electrodes 11 and 12 such that the carbon formed in the reaction would form at the carbon electrode 11. The whole cell was heated to 800° C. and $CO_2$ admitted via a conduit 14 to the chamber 11a having the carbon electrode. Conduit 15 permits egress of superfluous $CO_2$. The other chamber 12a was flushed with nitrogen. After a period of operation the effluent gas stream emerging from the silver electrode chamber 12a via conduit 16 was analyzed and found to contain 60 percent oxygen, the remainder being nitrogen. From this I conclude that the cell was acting to decompose $CO_2$ and to liberate $O_2$. The flushing operation can be omitted where pure oxygen is desired as a final product.

While I have described and illustrated one specific embodiment of my invention, it will be clear that variations of the details of construction of the apparatus, materials used for electrodes and materials used for the solid electrolyte which are specifically illustrated and described may be resorted to without departing from the true spirit and scope of the invention as defined in the appended claims.

What I claim is:

1. A process for the production of $O_2$ from $CO_2$, comprising electrochemically decomposing $CO_2$ into $O_2$ and a carbon by-product in a cell having for an electrolyte a mixed oxide solid solution having a complete cation lattice and a deficient anion lattice by applying a voltage across the cell such that the electrode at which the $CO_2$ is fed is the negative electrode while the other electrode on the other side of the solid electrolyte is the positive electrode, the whole cell being operated in a temperature range above 400° C.

2. The process according to claim 1 wherein said electrolyte has a fluorite lattice structure.

3. The process according to claim 2 wherein said solid electrolyte comprises a mixture of oxides from the group consisting of $ZrO_2$, $ThO_2$, $Y_2O_3$, and $La_2O_3$.

4. The process according to claim 3 wherein said negative electrode is a gas-pervious carbon electrode, and said positive electrode is a gas-pervious silver electrode.

5. The process according to claim 4 wherein said temperature range is from 400° C. to 900° C.

6. Apparatus for electrochemical conversion of $CO_2$ into $O_2$ and a carbon by-product, comprising an electrolytic cell including a gas-pervious cathode comprising carbon and a gas-pervious anode comprising silver, a mixed oxide solid electrolyte interposed between said cathode and said anode, said electrolyte comprising a mixture of oxides from the group consisting of $ZrO_2$, $ThO_2$, $Y_2O_3$ and $La_2O_3$ and having a complete cation lattice and a deficient anion lattice in a fluorite lattice structure, said cell having a chamber partially enclosing said cathode and a region adjacent thereto, and having a further chamber partially enclosing said anode and a region adjacent thereto, means for introducing $CO_2$ into said first-named chamber, means for connecting a source of electrical energy between said anode and said cathode to bias said anode at a positive electrical potential relative to said cathode, so that oxygen ions are attracted to said anode from said $CO_2$ by migration across said electrolyte via said deficient anion lattice and $O_2$ is thereby formed in said further chamber, and means for withdrawing said $O_2$ from said further chamber, said cell being adapted for operation in a temperature range above 400° C.

7. The combination according to claim 6 wherein said cell is adapted for operation in the temperature range from 400° C. to 900° C.

References Cited by the Examiner

UNITED STATES PATENTS

| | | | |
|---|---|---|---|
| 2,636,851 | 4/1953 | Juda et al. | 204—296 |
| 2,690,465 | 9/1954 | Broder | 136—153 |
| 3,085,053 | 4/1963 | Taylor | 204—60 |

OTHER REFERENCES

Kiukkola: "Measurements on Galvanic Cells Involving Solid Electrolytes," Atomic Energy Commission NYO–7009, Aug. 15, 1956.

Peters et al.: Chem. Abstr., 54; 10472(d) (1960).

Peters et al.: Z. Physik. Chem., Leipzig, vol. 209, pages 298–309, 1958.

Weininger et al.: J. Chem. Phys., vol. 22, No. 8, pages 1469–1470 (August 1954).

Young: "Fuel Cells," vol I, June 1960, Reinhold Pub. Co.

HOWARD S. WILLIAMS, *Primary Examiner.*

JOSEPH REBOLD, MURRAY TILLMAN, JOHN H. MACK, WINSTON A. DOUGLAS, *Examiners.*

G. KAPLAN, L. G. WISE, H. M. FLOURNOY,
*Assistant Examiners.*